US006456963B1

(12) United States Patent
Araki

(10) Patent No.: US 6,456,963 B1
(45) Date of Patent: Sep. 24, 2002

(54) BLOCK LENGTH DECISION BASED ON TONALITY INDEX

(75) Inventor: Tadashi Araki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/531,320

(22) Filed: Mar. 20, 2000

(30) Foreign Application Priority Data

Mar. 23, 1999 (JP) .......................................... 11-077703

(51) Int. Cl.[7] ............................................... G10L 15/00

(52) U.S. Cl. .................................... 704/200.1; 704/229

(56) References Cited

U.S. PATENT DOCUMENTS 5,341,457 A * 8/1994 Hall, II et al. .............. 704/226
5,535,300 A * 7/1996 Hall, II et al. .............. 704/227
5,590,108 A * 12/1996 Mitsuno et al. ............. 704/229
5,608,713 A * 3/1997 Akagiri et al. .............. 704/204
5,627,938 A * 5/1997 Johnston .................. 704/200.1
5,682,463 A * 10/1997 Allen et al. ................. 704/230
5,699,479 A * 12/1997 Allen et al. ................. 704/205
5,918,203 A * 6/1999 Herre et al. ................ 704/205
5,978,762 A * 11/1999 Smyth et al. ............... 704/229

FOREIGN PATENT DOCUMENTS

JP 9-232964 9/1997 ............. G10L/9/18

* cited by examiner

*Primary Examiner*—David D. Knepper
(74) *Attorney, Agent, or Firm*—Dickstein Shapiro Morin & Oshinsky LLP

(57) ABSTRACT

A converting portion converts each of blocks of an input digital audio signal into a number of spectral frequency-band components, the blocks being produced from the signal along a time axis. A bit-allocating portion allocates coding bits to each frequency band. A scalefactor is determined in accordance with the number of the coding bits allocated. The digital audio signal is quantized using the scalefactors. Each block of the input digital audio signal is converted into the number of spectral frequency-band components. A tonality index of the digital audio signal is calculated in each of a predetermined one or plurality of frequency bands. The tonality index is compared with a predetermined one or plurality of thresholds. A decision to use the long or short block type is based on the thus-obtained comparison result.

11 Claims, 17 Drawing Sheets

| SHORT BLOCK (i) | PERCEPTUAL ENTROPY (PE(i)) |
|---|---|
| 0 | 110 |
| 1 | 96 |
| 2 | 118 |
| 3 | 124 |
| 4 | 137 |
| 5 | 152 |
| 6 | 269 |
| 7 | 231 |

FIG.14

| SHORT BLOCK (i) | TONALITY INDEX (tb[i][sfb]) | | | |
|---|---|---|---|---|
| | sfb=6 | sfb=7 | sfb=8 | sfb=9 |
| 0 | 0.09 | 0.12 | 0.08 | 0.15 |
| 1 | 0.07 | 0.11 | 0.23 | 0.18 |
| 2 | 0.04 | 0.07 | 0.15 | 0.06 |
| 3 | 0.05 | 0.09 | 0.08 | 0.10 |
| 4 | 0.11 | 0.14 | 0.13 | 0.17 |
| 5 | 0.25 | 0.35 | 0.44 | 0.40 |
| 6 | 0.67 | 0.82 | 0.95 | 0.89 |
| 7 | 0.23 | 0.42 | 0.84 | 0.81 |

FIG. 16

| SHORT BLOCK (i) | TONALITY INDEX (tb[i][sfb]) | | | |
|---|---|---|---|---|
| | sfb=6 | sfb=7 | sfb=8 | sfb=9 |
| 0 | 0.09 | 0.12 | 0.08 | 0.15 |
| 1 | 0.07 | 0.11 | 0.23 | 0.18 |
| 2 | 0.04 | 0.07 | 0.15 | 0.06 |
| 3 | 0.05 | 0.09 | 0.08 | 0.10 |
| 4 | 0.11 | 0.14 | 0.13 | 0.17 |
| 5 | 0.25 | 0.35 | 0.44 | 0.40 |
| 6 | 0.67 | 0.82 | 0.87 | 0.89 |
| 7 | 0.23 | 0.42 | 0.84 | 0.81 |

BLOCK LENGTH DECISION BASED ON TONALITY INDEX

BACKGROUND OF THE INVENTION

1. Field of the Invention

The present invention generally relates to a digital-audio-signal coding device, a digital-audio-signal coding method and a medium in which a digital-audio-signal coding program is stored, and, in particular, to compressing/coding of a digital audio signal used for a DVD, digital broadcast and so forth.

2. Description of the Related Art

In the related art, a human psychoacoustic characteristic is used in high-quality compression/coding of a digital audio signal. This characteristic is such that a small sound is inaudible as a result of being masked by a large sound. That is, when a large sound develops at a certain frequency, small sounds at vicinity frequencies are inaudible by the human ear as a result of being masked. The limit of a sound pressure level below which any signal is inaudible due to masking is called a masking threshold. Further, regardless of masking, the human ear is most sensitive to sounds having frequencies in vicinity of 4 kHz, and the sensitivity decreases as the frequency of the sound moves further away from 4 kHz. This feature is expressed by the limit of a sound pressure level at which the sound is audible in an otherwise quiet environment, and this limit is called an absolute hearing threshold.

Such matters will now be described in accordance with FIG. 1 which shows an intensity distribution of an audio signal. The thick solid line (A) represents the intensity distribution of the audio signal. The broken line (B) represents the masking threshold for the audio signal. The thin solid line (C) represents the absolute hearing threshold. As shown in the figure, for the human ear, only the sounds having the sound pressure levels higher than the respective masking levels for the audio signal and also higher than the absolute hearing level are audible by the human ear. Accordingly, even when only the information from the portions in which the sound pressure levels are higher than the respective masking levels for the audio signal and also higher than the absolute hearing level is extracted from the intensity distribution of the audio signal, the thus-obtained signal can be sensed as being the same as the original audio signal, acoustically.

This is equivalent to allocation of coding bits only to the hatched portions in FIG. 1 in coding of the audio signal. This bit allocation is performed in units of scalefactor bands (D) which are obtained as a result of the entire band of the audio signal being divided. The lateral width of each hatched portion corresponds to the respective scalefactor-band width.

In each scalefactor band, the sounds having the intensities lower than the lower limit of the respective hatched portion are inaudible using the human ear. Accordingly, as long as the error in intensity between the original signal and the coded and decoded signal does not exceed this lower limit, the difference therebetween cannot be sensed by the human ear. In this sense, the lower limit of a sound pressure level for each scalefactor band is called an allowable distortion level. When quantizing and compressing an audio signal, it is possible to compress the audio signal without degrading the sound quality of the original sound as a result of performing quantization in such a way that the quantization-error intensity of the coded and decoded sound with respect to the original sound does not exceed the allowable distortion level for each scalefactor band. Therefore, allocating coding bits only to the hatched portions is equivalent to quantizing the original audio signal in such a manner that the quantization-error intensity in each scalefactor band is just equal to the allowable distortion level.

Of such a method of coding an audio signal, MPEG (Moving Picture Experts Group) Audio, Dolby Digital and so forth are known. In any method, the feature described above is used. Among them, the method of MPEG-2 Audio AAC (Advanced Audio Coding) standardized in ISO/IEC 13818-7: 1997(E), 'Information technology—Generic coding of moving pictures and associated audio information—, Part 7: Advanced Audio Coding (AAC)' (simply referred to as ISO/IEC 13818-7, hereinafter) is presently said to have the highest coding efficiency. The entire contents of ISO/IEC 13818-7 are hereby incorporated by reference.

FIG. 2 is a block diagram showing a basic arrangement of an AAC (Advanced Audio Coding) encoder. An audio signal input to the AAC encoder is a sequence of blocks of samples which are produced along the time axis such that adjacent blocks overlap with one another. (The frequency with which the samples of sound are taken, which samples constitute the digital audio signal, is called 'sampling frequency of the digital audio signal'.) Each block of the audio signal is transformed into a number of spectral scalefactor-band components via a filter bank 73. A psychoacoustic model 71 calculates an allowable distortion level for each scalefactor-band component of the audio signal. A gain control 72 and the filter bank 73 map the blocks of the audio signal into the frequency domain through MDCT (Modified Discrete Cosine Transform). A TNS (Temporal Noise Shaping) 74 and a predictor 76 perform predictive coding. An intensity/coupling 75 and an MS stereo (Middle Side Stereo) (abbreviated as M/S, hereinafter) 77 perform stereophonic correlation coding. Then, scalefactors are determined by a scalefactor module 78, and a quantizer 79 quantizes the audio signal based on the scalefactors. The scalefactors correspond to the allowable distortion level shown in FIG. 1, and are determined for the respective scalefactor bands. After the quantization, based on a predetermined Huffman-code table, a noiseless coding module 80 provides Huffman codes for the scalefactors and for the quantized values, and performs noiseless coding. Finally, a multiplexer 81 forms a code bitstream.

MDCT performed by the filterbank 73 is such that DCT is performed on the audio signal in such a way that adjacent transformation ranges are overlapped by 50% along the time axis, as shown in FIG. 3. Thereby, distortion developing at a boundary portion between adjacent transformation ranges can be suppressed. Further, the number of MDCT coefficients generated is half the number of samples included in the transformation range. In AAC, either a long transformation range (defined by a long window) or short transformation ranges (each defined by a short window) is/are used for mapping the audio signal into the frequency domain. The portion of each block of the input audio signal defined by the long window is called a long block, and the portion of each block of the input audio signal defined by the short window is called a short block, wherein the long block includes 2048 samples and the short block includes 256 samples. In MDCT, defining long blocks from an audio signal, each for a first predetermined number of samples (2048 samples, in the above-mentioned example, as shown in FIG. 4) with a long window, for performing MDCT on the audio signal using the thus-defined long blocks for mapping the audio signal into the frequency domain will be referred to as 'using the long block type', and defining short blocks from an audio signal, each for a second predetermined number (smaller than the first predetermined number) of samples (256 samples, in the above-mentioned example, as shown in FIG. 5) with a short window, for performing MDCT on the audio signal using thus-defined short blocks for mapping the audio signal into the frequency domain will be referred to as 'using the short block type', hereinafter. The number of MDCT coefficients generated from the long block is 1024, and the number of MDCT coefficients generated from each short block is 128. When the short block type is used, 8 short blocks are defined successively at any time (as shown in FIG. 5). Thereby, the number of MDCT coefficients generated is the same when using the short block type and using the long block type.

Generally, for a steady portion in which variation in signal waveform is a little as shown in FIG. 4, the long block type is used. For an attack portion in which variation in signal waveform is violent as shown in FIG. 5, the short block type is used. Which thereof is used is important. When the long block type is used for a signal such as that shown in FIG. 5, noise called pre-echo develops preceding an attack portion. When the short block type is used for a signal such as that shown in FIG. 4, suitable bit allocation is not performed due to lack of resolution in the frequency domain, the coding efficiency decreases, and noise develops, too. Such drawbacks are remarkable especially for a low-frequency sound.

When the short block type is used, grouping is performed. The grouping is to group the above-mentioned 8 successive short blocks into groups, each group including one or a plurality of successive blocks, the scalefactor for which is the same. By treating a plurality of blocks, for which the scalefactor is common, as those included in one group, it is possible to improve the information amount reducing effect. Specifically, when the Huffman codes are allocated to the scalefactors in the noiseless coding module 80 shown in FIG. 2, allocation is performed not in short-block units but in the group unit. FIG. 6 shows an example of grouping. In the case of FIG. 6, the number of groups is 3, the 0-th group includes 5 blocks, the 1-th group includes 1 block, and the 2-th group includes 2 blocks. When grouping is not performed appropriately, increase in the number of codes and/or degradation of the sound quality occur. When the number of groups is too large with respect to the number of blocks, the scalefactors which otherwise can be coded in common will be coded repeatedly, and, thereby, the coding efficiency decreases. When the number of groups is too small with respect to the number of blocks, common scalefactors are used even when variation of the audio signal is violent. As a result, the sound quality is degraded. In ISO/IEC13818-7, with regard to grouping, although rules for syntax of codes are included, no specific standards/methods for grouping are included.

As described above, when coding is performed, the long block type and short block type are appropriately used for an input audio signal. Deciding whether the long or short block type is used is performed by the psychoacoustic model 71 in FIG. 2. ISO/IEC 13818-7 includes an example of a method for making a decision as to whether the long or short block type is used for each target block. This deciding processing will now be described in general.

Step 1: Reconstruction of an Audio Signal 1024 samples for a long block (128 samples for a short block) are newly read, and, together with 1024 samples (128 samples) already read for the preceding block, a series of signals having 2048 samples (256 samples) is reconstructed.

Step 2: Windowing by Hann Window and FFT

The 2048 samples (256 samples) of audio signal reconstructed in the step 1 is windowed by a Hann window, FFT (Fast Fourier Transform) is performed on the signal, and 1024(128) FFT coefficients are calculated.

Step 3: Calculation of Predicted Values for FFT Coefficient

From the real parts and imaginary parts of the FFT coefficients for the preceding two blocks, the real parts and imaginary parts of the FFT coefficients for the target block are predicted, and 1024 (128) predicted values are calculated for each of them.

Step 4: Calculation of Unpredictability

From the real parts and imaginary parts of the FFT coefficients calculated in the step 2 and the predicted values for the real parts and imaginary part of the FFT coefficients calculated in the step 3, unpredictability is calculated for each of them. Unpredictability has a value in the range of 0 to 1. When unpredictability is close to 0, this indicates that the tonality of the signal is high. When unpredictability is close to 1, this indicates that the tonality of the signal is low.

Step 5: Calculation of the Intensity of the Audio Signal and Unpredictability for Each Scalefactor Band The scalefactor bands are ones corresponding to those shown in FIG. 1. For each scalefactor band, the intensity of the audio signal is calculated based on the respective FFT coefficients calculated in the step 2. Then, the unpredictability calculated in the step 4 is weighted with the intensity, and the unpredictability is calculated for each scalefactor band.

Step 6: Convolution of the Intensity and Unpredictability with Spreading Function Influences of the intensities and unpredictabilities in the other scalefactor bands for each scalefactor band are obtained using the spreading function, and they are convolved, and are normalized, respectively.

Step 7: Calculation of Tonality Index

For each scalefactor band b, based on the convolved unpredictability (cb(b)) calculated in the step 6, the tonality index tb(b) ($=-0.299-0.43\log_e(cb(b))$) is calculated. Further, the tonality index is limited to the range of 0 to 1. The tonality index indicates a degree of tonality of the audio signal. When the index is close to 1, this means that the tonality of the audio signal is high. When the index is close to 0, this means that the tonality of the audio signal is low.

Step 8: Calculation of S/N Ratio

For each scalefactor band, based on the tonality index calculated in the step 7, an S/N ratio is calculated. Here, a property that the masking effect is larger for low-tonality signal components than for high-tonality signal components is used.

Step 9: Calculation of Intensity Ratio

For each scalefactor band, based on the S/N ratio calculated in the step 8, the ratio between the convolved audio signal intensity and masking threshold is calculated.

Step 10: Calculation of Allowable Distortion Level

For each scalefactor band, based on the audio signal intensity calculated in the step 6, and the ratio between the audio signal intensity and masking threshold calculated in the step 9, the masking threshold is calculated.

Step 11: Consideration of Pre-echo Adjustment and Absolute Hearing Threshold

Pre-echo adjustment is performed on the masking threshold calculated in the step 10 using the allowable distortion level of the preceding block. Then, the larger one between the thus-obtained adjusted value and the absolute hearing threshold is used as the allowable distortion level of the currently processed block.

Step 12: Calculation of Perceptual Entropy (PE)

For each block type, that is, for the long block type and for the short block type, a perceptual entropy (PE) defined by the following equation is calculated:

$$PE = -\sum_{b} w(b) \cdot \log_{10} \frac{nb(b)}{e(b)+1}$$

In the above equation, w(b) represents the width of the scalefactor band b, nb(b) represents the allowable distortion level in the scalefactor band b calculated in the step 11, and e(b) represents the audio signal intensity in the scalefactor band b calculated in the step 5. It can be considered that PE corresponds to the sum total of the areas of the bit allocation ranges (hatched portions) shown in FIG. 1.

Step 13: Decision of Long/Short Block Type (see a flow chart shown in FIG. 7 for decision as to whether the long or short block type is used).

When the value of PE (obtained in a step S10 in FIG. 7) calculated for the long block type in the step 12 is larger than a predetermined constant (switch_pe), the short block type is used for the target block (in steps S11 and S12, in FIG. 7). When the value of PE calculated for the long block type in the step 12 is not larger than the predetermined constant (switch_pe), the long block type is used for the target block (in steps S11 and S13, in FIG. 7). The constant, switch_pe, is determined depending on the application.

The above-described method is the method for decision as to whether the long or short block type is used, described in ISO/IEC13818-7. However, in this method, an appropriate decision is not always reached. That is, the long block type is selected to be used even in a case where the short block type should be selected, or, the short block type is selected to be used even in a case where the long block type should be selected. As a result, the sound quality may be degraded.

Japanese Laid-Open Patent Application No. 9-232964 discloses a method in which an input signal is taken at every predetermined section, the sum of squares is obtained for each section, and a transitional condition is detected from the degree of change in the signal of the sum of squares between at least two sections. Thereby, it is possible to detect the transient condition, that is, to detect when a block type to be used is changed between the long and short block types, merely as a result of calculating the sum of squares of the input signal on the time axis without performing orthogonal transformation processing or filtering processing. However, this method uses only the sum of squares of an input signal but does not consider the perceptual entropy. Therefore, a decision not necessarily suitable for the acoustic property may be made, and the sound quality may be degraded.

A method will now be described. In the method, the short blocks of a block of an input audio signal are grouped in a manner such that the difference between the maximum value and minimum value in perceptual entropy of the short blocks in the same group is smaller than a threshold. Then, when the result thereof is such that the number of groups is 1, or this condition and another condition are satisfied, the block of the input audio signal is mapped into the frequency domain using the long block type. In the other cases, the block of the input audio signal is mapped into the frequency domain using the short block type. This method is performed by an arrangement shown in FIG. 8B. An entropy calculating portion 31 calculates the perceptual entropy for each short block. A grouping portion 32 groups ones of the short blocks. A difference calculating portion 33 calculates the difference between the maximum value and minimum value in perceptual entropy of the short blocks included in the thus-obtained group. A grouping determining portion determines, based on the thus-obtained difference, whether the grouping is allowed. A long/short-block-type deciding portion 35 decides to use the long or short block when the number of the thus-allowed groups is 1.

This method will now be described in detail in accordance with FIG. 8A showing an operation flow of this method. As an example of an input audio signal, audio data shown in FIG. 9 is used. In FIG. 9, corresponding consecutive numbers are given to 8 successive short blocks. The perceptual entropy PE(i) of the audio data shown in FIG. 9 for each short block i is shown in FIG. 10.

First, 8 short blocks are obtained from a block of an input audio signal, as shown in FIG. 9. Then, for the 8 short blocks, the perceptual entropies are calculated, respectively, and are represented by PE(i) ($0 \leqq i \leqq 7$), in sequence, in a step S20. This calculation can be achieved as a result of the method described in the steps 1 through 12 of the method for deciding as to whether the long or short block type is used for each target block in ISO/IEC13818-7 described above being performed on each short block. Then, initializing is performed such that group_len[0]=1, and group_len [gnum]=0 ($0 \leqq gnum \leqq 7$) in a step S21, wherein gnum represents a respective one of consecutive numbers of groups resulting from grouping, and group_len[gnum] represents the number of the short blocks included in the gnum-th group. Then, initializing is performed such that gnum=0, min=PE(0) and max=PE(0), in a step S22. These min and max represent the minimum value and the maximum value of PE(i), respectively. Then, the index i is initialized so that i=1, in a step S23. This index corresponds to a respective one of the consecutive numbers of the short blocks.

Then, min and max are updated with PE(i). That is, when PE(i)<min, min=PE(i), and when PE(i)> max, max=PE(i), in a step S24. Then, a decision is made as to grouping, in a step S25. That is, the difference, max−min, is obtained, is compared with a predetermined threshold th, and, when the difference is equal to or larger than the threshold th, the operation proceeds to a step S26 so that the short blocks i−1 and i are included in different groups. When the difference is smaller than the threshold th, a decision is made such that the short blocks i−1 and i are included in the same group, and the operation proceeds to a step S27. In this example, it is assumed that th=50. That is, grouping is performed such that the difference between the maximum value and minimum value of PE(i) becomes smaller than 50. A decision is made such that the short blocks 0 and 1 are included in the same group, and the operation proceeds to the step S27. Because gnum=0 in this time, the short blocks 0 and 1 are included in the 0-th group. Then, the value of group_len [gnum] is incremented by 1 in a step S28. This means that the number of short blocks included in the gnum-th group is increased by 1. In this example, because initializing is performed such that gnum=0 and group_len[0]=1 in the steps S21 and S22, group_len [0]=2 in the step S27. This corresponds to the matter that the two blocks, block 0 and block 1, are already fixed as the short blocks included in the 0-th group.

Then, the index i is incremented by 1 in a step S28. Then, when i is smaller than 7, the operation returns to the step S24, in a step S29.

Then, operations similar to those described above are repeated until i=4. When i=4, in the example shown in FIGS. 9 and 10, min=96 and max=137 in the step S24. Then, in the step S25, max−min=41<50=th. As a result, the operation proceeds to the step 27 from the step 25. Then, in the step S27, group_len[0]=5. This corresponds to the matter that the five blocks, blocks 0, 1, 2, 3 and 4, are fixed as the short blocks included in the 0-th group. Then, after i=5 in the step S28, the operation again returns to the step S24 through the step S29. Then, because PE(5)=152 at this time, min=96 and max=152. Then, in the step S25, max−min=56>50=th, in the step S25. As a result, the operation proceeds to the step S26. This means that the short blocks 4 and 5 are included in different groups. In the step S26, the value of gnum is incremented by 1, and each of min and max is replaced by the latest PE(i). Here, gnum=1, min=152 and max=152. The matter that gnum=1 corresponds to the matter that the group includes the short block 5 is the 1-th group.

Then, in the step S27,group_len[1] is incremented by 1. Because the group_len[1] is initialized to be 0 in the step S21, again group_len[1]=1, here. This corresponds to the matter that one block, the block 5 is fixed as the short block included in the 1-th group.

Then, similarly, i=6 in the step S28 in FIG. 8A, and the operation returns to the step S24 from the step S29. Then, at this time, because PE(6)=269, min=152 and max=269. Then, in the step S25, max−min=117>50=th, and, as a result, the operation proceeds to the step S26. That is, the short blocks 5 and 6 are included in different groups. Then, in the step s26, gnum=2, min=269 and max=269. Then, in the step S27, group_len[2]=1. Then, in the step S28, i=7. Then, similarly to the above, because PE(7)=231 in the step S24, min=231 and max=269. Then, in the step S25, max−min=38<50=th. As a result, the operation proceeds to the step S27. That is, both the short blocks 6 and 7 are included in the 2-th group. Correspondingly thereto, group_len[2]=2 in the step S27. Then, in the next step S28, i=8. Then, in the step S29, the operation is decided to proceed to the step S30. Thus, grouping is completed for all the 8 short blocks.

In this example, in the end, gnum=2, group_len[0]=5, group_len[1]=1 and group_len[2]=2. That is, the number of groups is 3, the 0-th group includes 5 short blocks, the 1-th group includes one short block and the 2-th group includes two short blocks.

How to decide, from the number of groups as the result of grouping, whether the long or short block type is used will now be described. In the step S30, it is determined whether or not the value of gnum is 0. When the value of gnum is 0, the number of groups is 1. When the value of gnum is not 0, the number of groups is equal to or larger than 2. Therefore, when gnum=0, the operation proceeds to a step 31, and it is decided to perform MDCT on the block of the input audio signal using the long block type, that is, a single long block is obtained from the block of the input audio signal for performing MDCT on-the input audio signal. When gnum≠0, the operation proceeds to a step 32, and it is decided to perform MDCT on the block of the input audio signal using the short block type, that is, 8 short blocks are obtained from the block of the input audio signal for performing MDCT on the input audio signal.

However, also in this method, there is a case where an appropriate decision as to whether the long or short block type is used cannot be performed. This case is a case where audio data including low frequency components having high tonalities is coded. MDCT using the short block type results in increase in the resolution in the time domain, but decrease in the resolution in the frequency domain. Further, the human ear has a masking property such that the resolution is high in a low-frequency range, and, in particular, only a very narrow frequency-band component is masked in audio data having high tonality. When audio data including low frequency components having high tonalities is mapped into the frequency domain using the short block type, due to decrease to the resolution in the frequency domain when the short block type is used, the energy of the original audio data is dispersed in surrounding frequency bands. Then, when the energy thus spreads to the outside of the masking range in low-frequency components of the human ear, the human ear senses degradation in the sound quality. This indicates that decision as to whether the long or short block type is used based only on the perceptual entropies of the short blocks is not sufficient, and, it is necessary to consider to further combine tonality of audio data and the frequency-dependency of the masking property.

SUMMARY OF THE INVENTION

The present invention has been devised for solving these problems, and, an object of the present invention is to provide, with the tonality of an input audio data and frequency dependency of masking property of the human ear in mind, conditions for enabling an appropriate decision as to whether the long or short block type is used without resulting in degradation in the sound quality, and to provide a digital-audio-signal coding device, a digital-audio-signal coding method and a medium in which a digital-audio-signal coding program is stored, in which it is possible to make a decision as to whether the long or short block type is used appropriately depending on the sampling frequency of input audio data.

In order to achieve the above-mentioned objects, a device for coding a digital audio signal according to the present invention comprises:

- a converting portion which converts each of blocks of an input digital audio signal into a number of frequency-band components, the blocks being produced from the signal along a time axis;
- a bit-allocating portion which allocates coding bits to each frequency band;
- a scalefactor determining portion which determines a scalefactor in accordance with the number of the coding bits thus allocated; and
- a quantizing portion which quantizes the digital audio signal using the thus-determined scalefactors, wherein:

- the converting portion comprises a block-type deciding portion which makes a decision as to whether a long or short block type is used for mapping the input digital audio signal into the frequency domain;
- the block-type deciding portion comprises:
  - a tonality-index calculating portion which calculates a tonality index of the digital audio signal in each of a predetermined one or plurality of frequency bands of the number of frequency bands;
  - a comparing portion which compares each of the thus-calculated tonality indexes with a predetermined one or plurality of thresholds; and
  - a deciding portion which makes a decision as to whether the long or short block type is used based on the thus-obtained comparison result.

The block-type deciding portion may further comprise a parameter deciding portion which decides parameters and/or a determining expression to be used in a process of making a decision as to whether the long or short block type is used, depending on the sampling frequency of the input digital audio signal.

The block-type deciding portion may further comprise a decision method deciding portion which makes a decision that a decision be made as to whether the long or short block is used using the tonality indexes, when the sampling frequency of the input digital audio signal is larger than a predetermined threshold.

The parameter deciding portion may increase the number of the frequency bands to be used and shifts the frequency bands to be selected to higher ones, when the sampling frequency is lower.

Thereby, the following problems can be solved: When the number of frequency bands used for the decision is small, only the tonality in the limited number of frequency bands is considered. Accordingly, in a case where the tonality is high in other frequency bands, and, therefore, the long block type should be used, a decision is made to use the short block type. Further, when the number of frequency bands used for the decision is large, a decision is made to use the long block type only in a special case where the tonality is high in every frequency band thereof.

As a result, it is possible to provide appropriate determination conditions for making a decision as to whether the long or short block type is used, with the tonality of input audio data and frequency dependency of masking property of the human ear in mind, so that the use of the thus-provided determination conditions does not result in degradation in the sound quality.

Other objects and further features of the present invention will become more apparent from the following detailed description when read in conjunction with the accompanying drawings.

BRIEF DESCRIPTION OF THE DRAWINGS

FIG. 14 shows an example of tonality indexes of an audio signal in each short block;

FIG. 16 shows another example of tonality indexes of an audio signal in each short block;

DETAILED DESCRIPTION OF THE PREFERRED EMBODIMENTS

Figure 1:
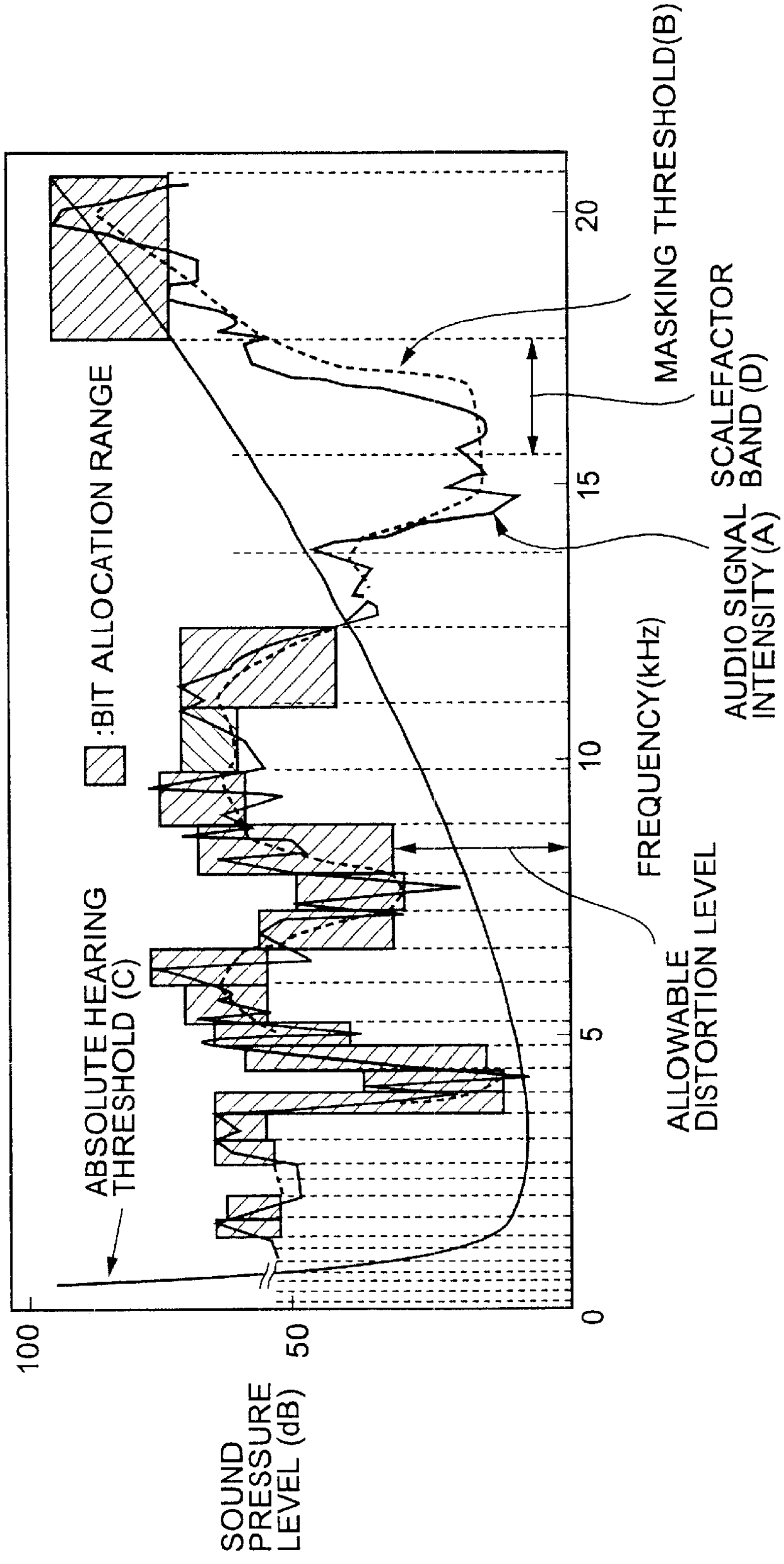
FIG. 1 shows a diagram explaining a relationship between the absolute hearing threshold and masking threshold in a spectral distribution of an audio signal.
Figure 2:
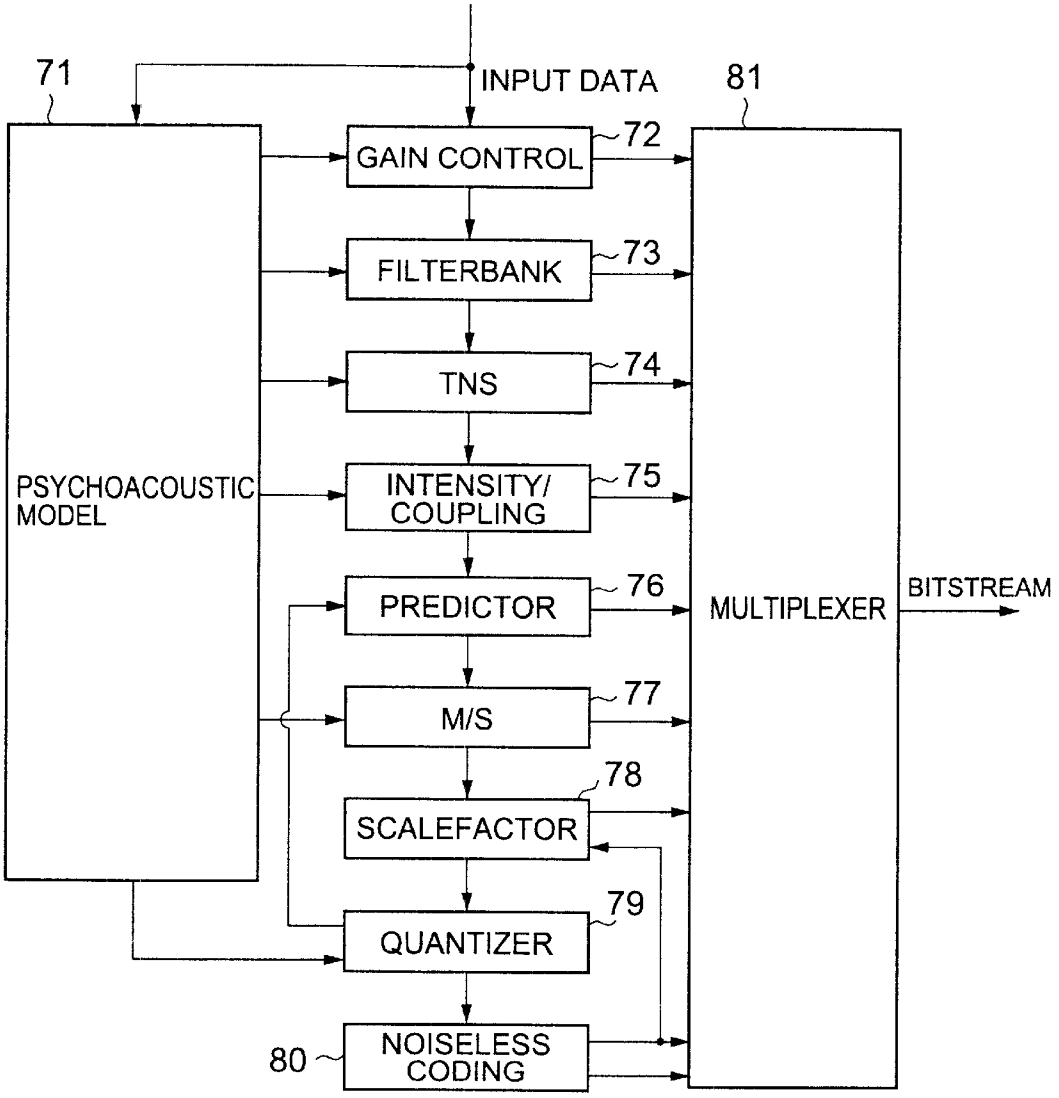
FIG. 2 is a block diagram showing a basic structure of an AAC encoder.
Figure 3:
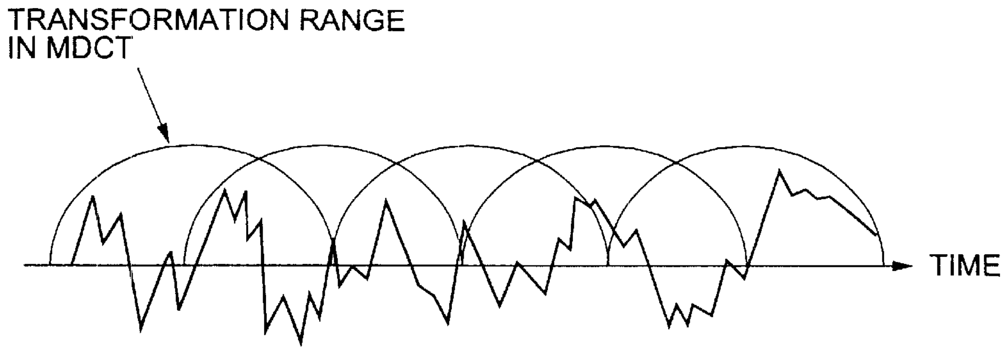
FIG. 3 shows transformation ranges in MDCT.
Figure 4:
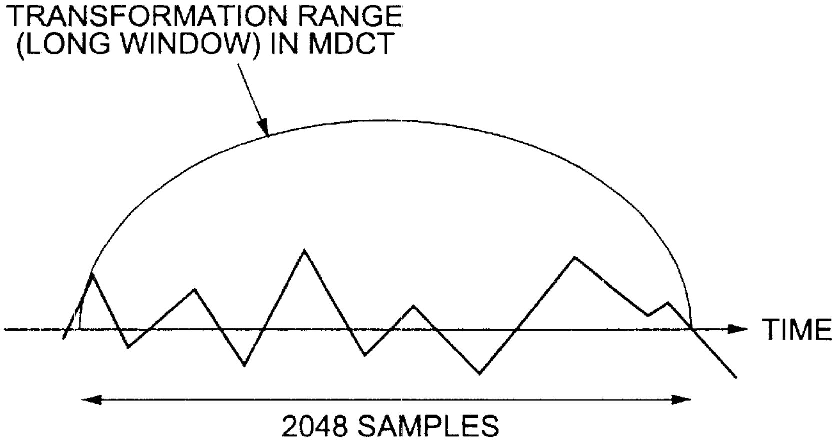
FIG. 4 shows transformation ranges in MDCT for a signal waveform having a gentle variation.
Figure 5:
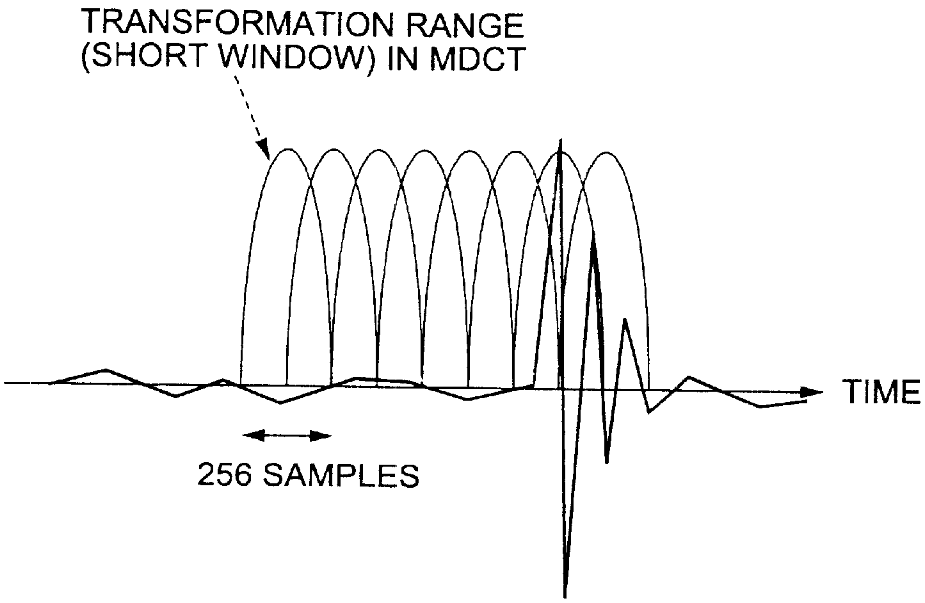
FIG. 5 shows transformation ranges in MDCT for a signal waveform having a violent variation.
Figure 6:
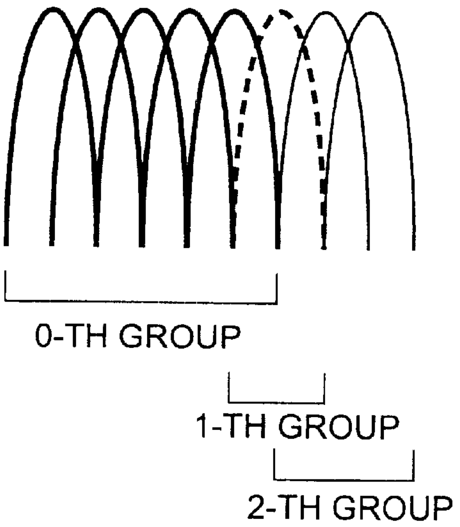
FIG. 6 shows an example of grouping.
Figure 7:
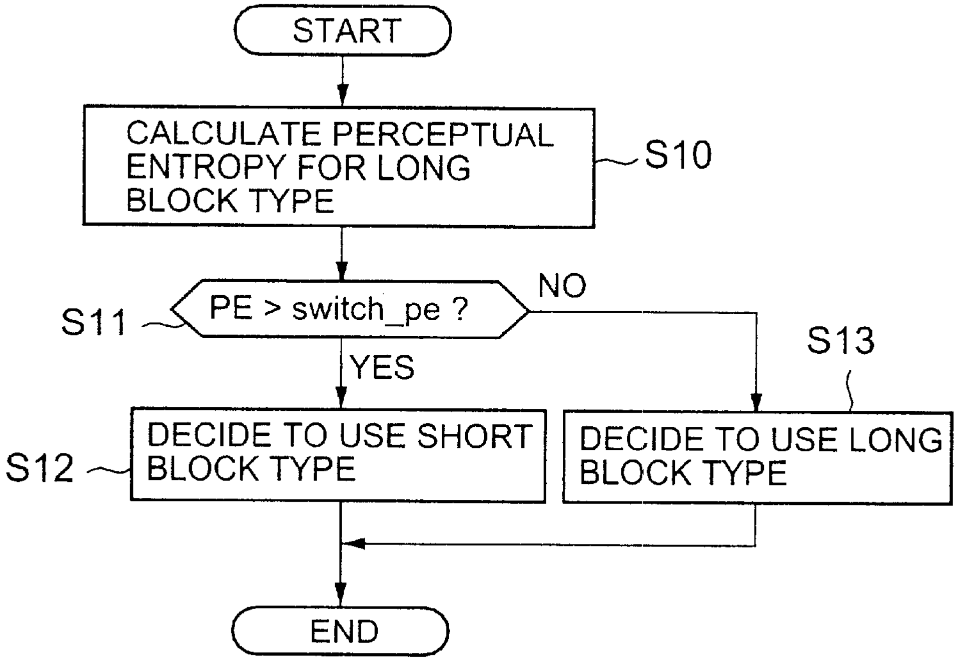
FIG. 7 is a flow chart showing operations for making decisions as to whether the long or short block type is used, described in ISO/IEC13818-7.
Figure 11:
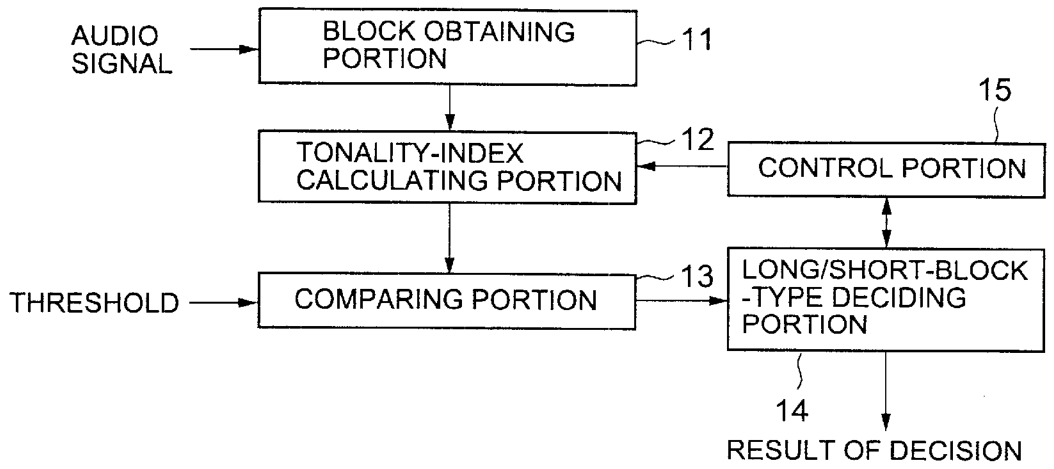
FIG. 11 is a block diagram partially showing a digital-audio-signal processing device according to the present invention.

FIG. 11 is a block diagram partially showing an arrangement of a digital-audio-signal coding device according to the present invention. The digital-audio-signal coding device according to the present invention may have the same arrangement as the AAC encoder described above using FIG. 2 in accordance with ISO/IEC13818-7 except that the psychoacoustic model 71 includes the arrangement for making a decision as to whether the long or short block type is used according to the present invention shown in FIG. 11 and described below. Similarly, the digital-audio-signal coding method according to the present invention may be the same as that performed by the AAC encoder described above using FIG. 2 in accordance with ISO/IEC13818-7 except that the method for making a decision as to whether the long or short block type is used according to the present invention described below is used.

Figures 9, 10:
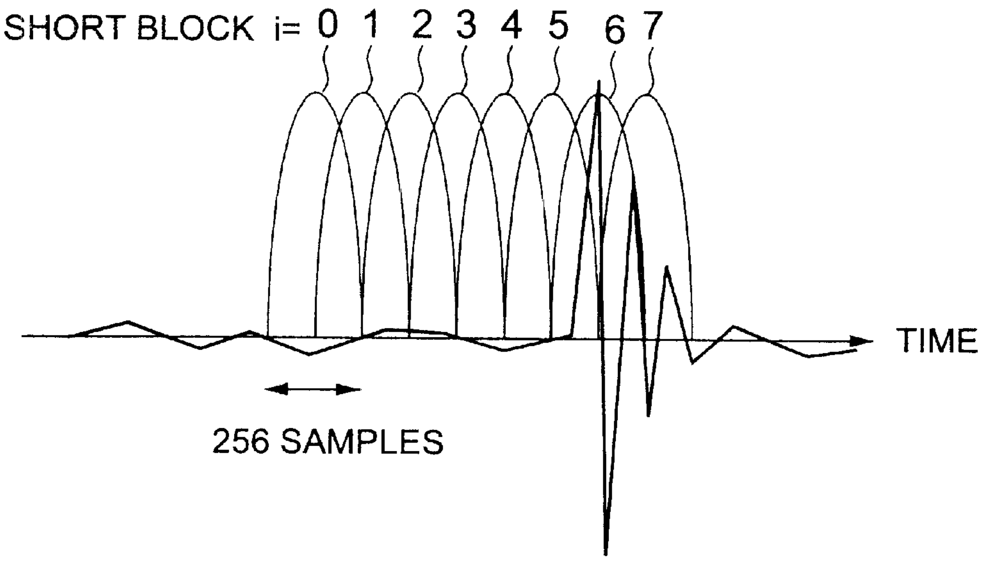
FIG. 9 shows a waveform of an example of one block of an input audio signal.
FIG. 10 shows the perceptual entropy of each short block of the input audio signal shown in FIG. 9.
Figure 12:
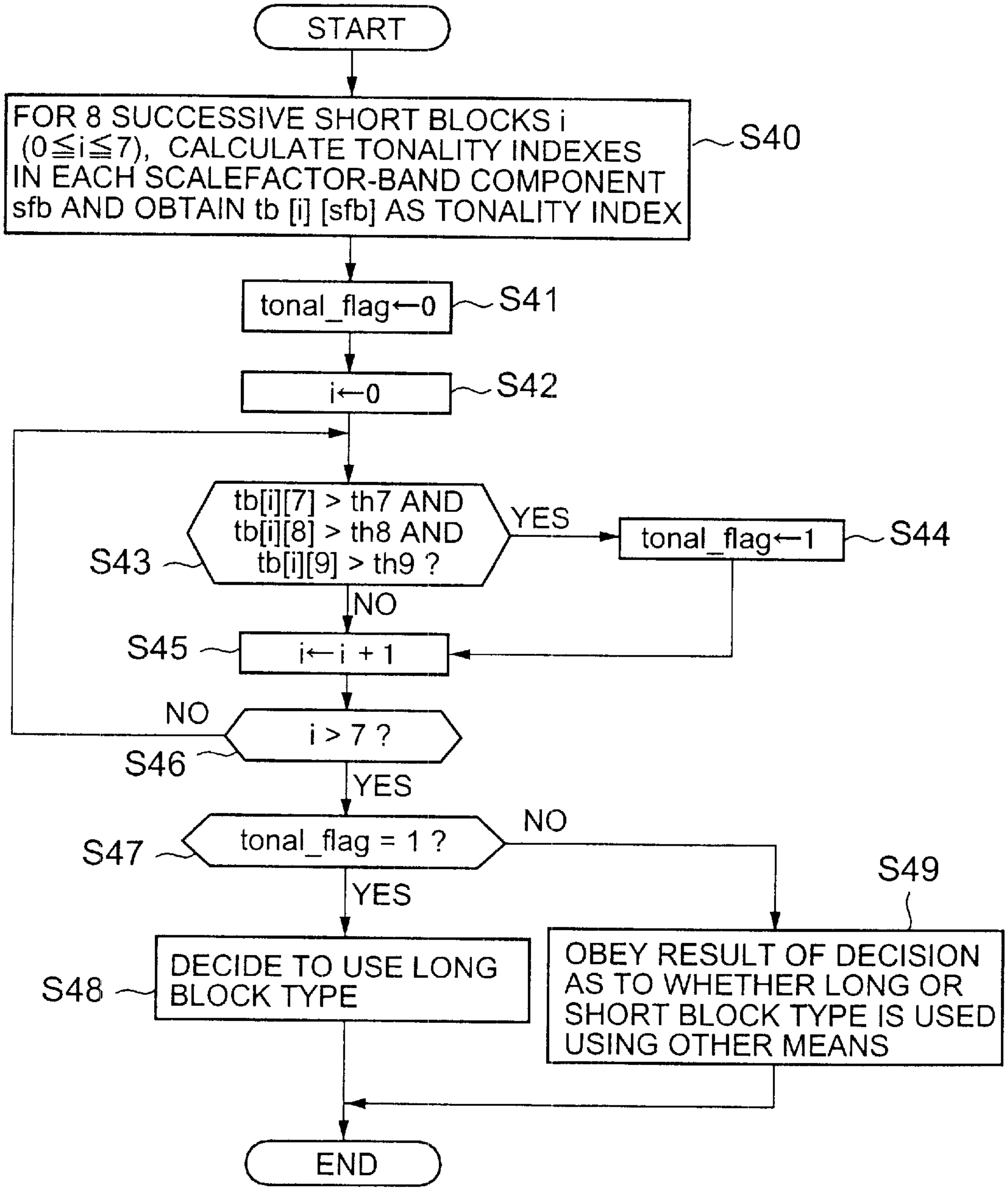
FIG. 12 is a flow chart of operations of the digital-audio-signal processing device in a first embodiment of the present invention.

The digital-audio-signal coding device according to the present invention includes a block obtaining portion 11. An audio signal, input to the block obtaining portion 11 is a sequence of blocks of samples which are produced along the time axis. The block obtaining portion 11 obtains, from each block of the input audio signal, a predetermined number of successive blocks, in the embodiments described below, 8 successive blocks, such that adjacent blocks overlap with one another, as shown in FIG. 9. The digital-audio-signal coding device further includes a tonality-index calculating portion 12 which calculates the tonality index of each one of the thus-obtained blocks using the above-mentioned calculation equation, a comparing portion 13 which compares the thus-calculated tonality index with a predetermined threshold, a long/short-block-type deciding portion 14 which make a decision as to whether the long or short block type is used based on the thus-obtained comparison result, and a control portion which controls operations of each portion. FIG. 12 is a flow chart showing operations of the digital-audio-signal coding device in the first embodiment.

The operations of the first embodiment of the present invention will now be described using FIGS. 11 and 12.

In the operations, 8 short blocks are obtained from a block of an input audio signal, and, then, for each short block, it is determined whether the tonality index(es) of audio components included in a predetermined one or a plurality of scalefactor-band components are larger than thresholds predetermined for the respective scalefactor bands. Then, when at least one short block exists for which the tonality indexes are larger than the predetermined thresholds for all the predetermined one or plurality of scalefactor-band components, it is decided to use the long block type for the block of the input audio signal, that is, a single long block is obtained from the block of the input audio signal for mapping the input audio signal into the frequency domain. This method will now be described in detail in accordance with FIG. 12 showing an operation flow of the method. Similarly to the above-mentioned method, the audio data shown in FIGS. 9 and 10 are used as an example of an input audio signal.

Figure 13:
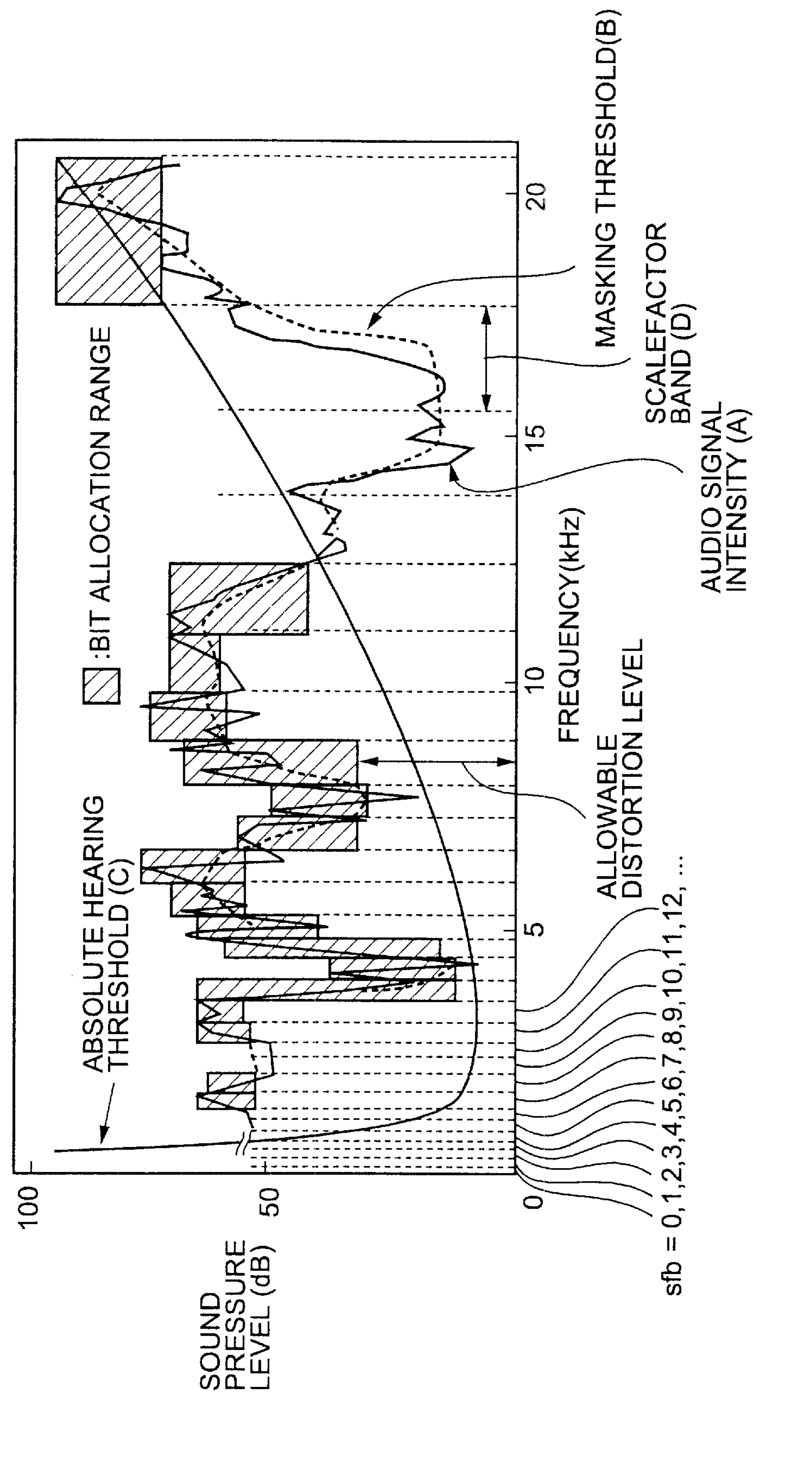
FIG. 13 shows a manner of providing scalefactor-band identifying numbers.

First, for each of the successive 8 short blocks i (0≦i≦7) of the input audio signal, obtained from the block obtaining portion 11, the tonality indexes in the respective sfb are calculated, and, thus, tb[i][sfb] is obtained in a step S40. The sfb's are respective ones of consecutive numbers for identifying the respective scalefactor bands, as shown in FIG. 13. The calculation of the tonality indexes is performed, by the tonality-index calculating portion 12, in accordance with the step 7 in the above-described method of deciding as to whether the long or short block type is used for each target block in ISO/IEC13818-7. Then, initializing is performed such that tonal_flag=0, in a step S41. Further, the number i of the short block is initialized to be 0, in a step S42. Then, for the short block i, it is determined whether or not, in a predetermined one or a plurality of scalefactor bands, the respective tonality indexes are larger than thresholds predetermined for the respective scalefactor bands, in a step S43. In the example of FIG. 12, the determination is performed by the comparing portion 13 for the scalefactor bands, sfb of which are 7, 8 and 9, and the thresholds for the tonality indexes thereof are assumed to be th7, th8 and th9, respectively.

In this example, it is assumed that, for the respective short blocks i, the tonality indexes in the scalefactor bands, sfb of which are 7, 8 and 9, are those shown in FIG. 14. Further, it is assumed that th7=0.6, th8=0.9, th9=0.8. Then, when i=0 at first, tb[0][7]=0.12<0.6=th7, tb[0][8]=0.08<0.9=th8, tb[0][9]=0.15<0.8=th9. Therefore, the result of the determination in the step S43 is NO. Then, the operation proceeds next to a step S45. Then, the value of i is incremented by 1 so that i=1, and, the operation passes through the determination in a step S46, and returns to the step S43.

Figure 8A:
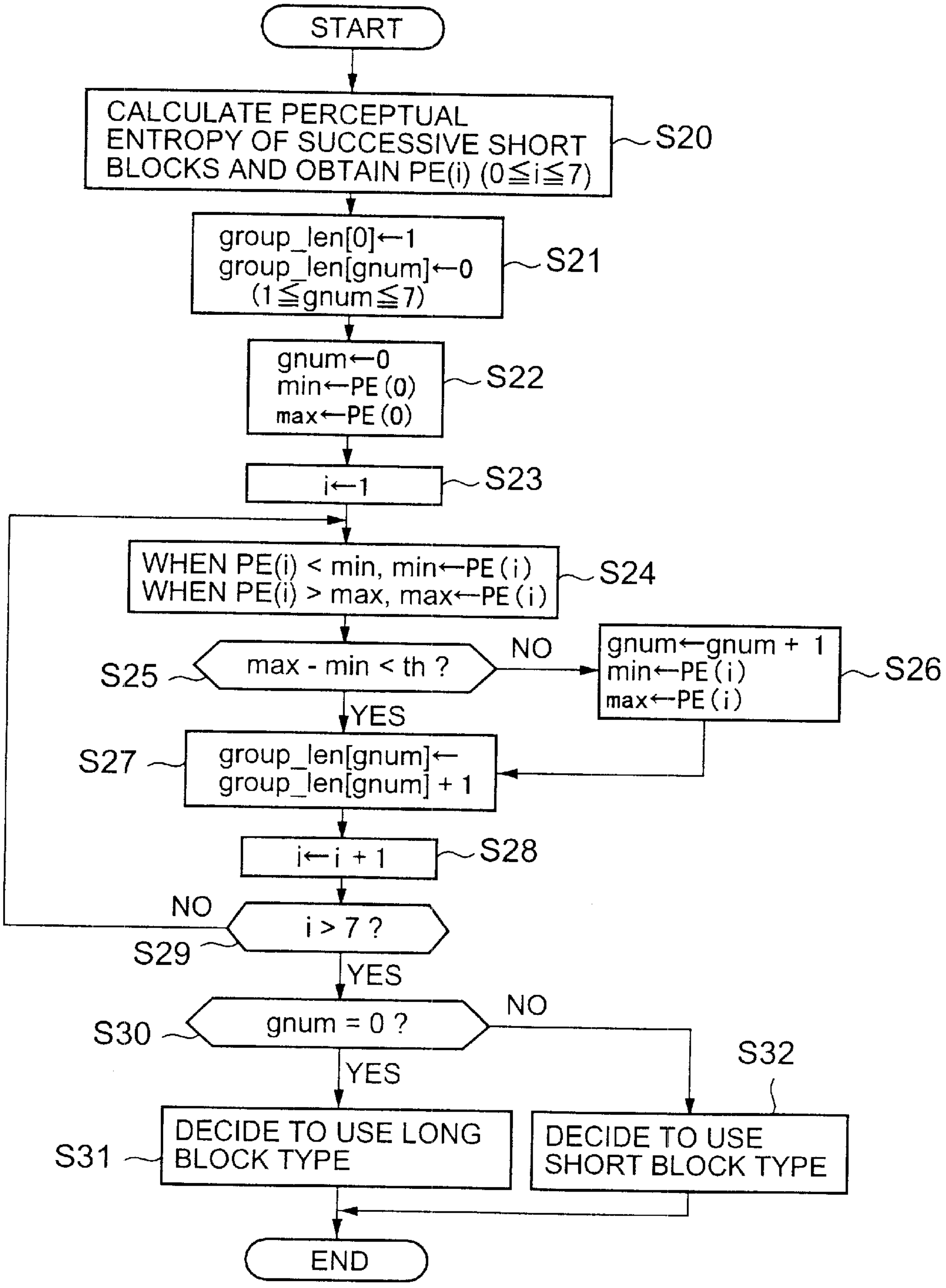
FIG. 8A is a flow chart showing operations for making decisions as to whether the long or short block type is used in the related art.
Figure 8B:
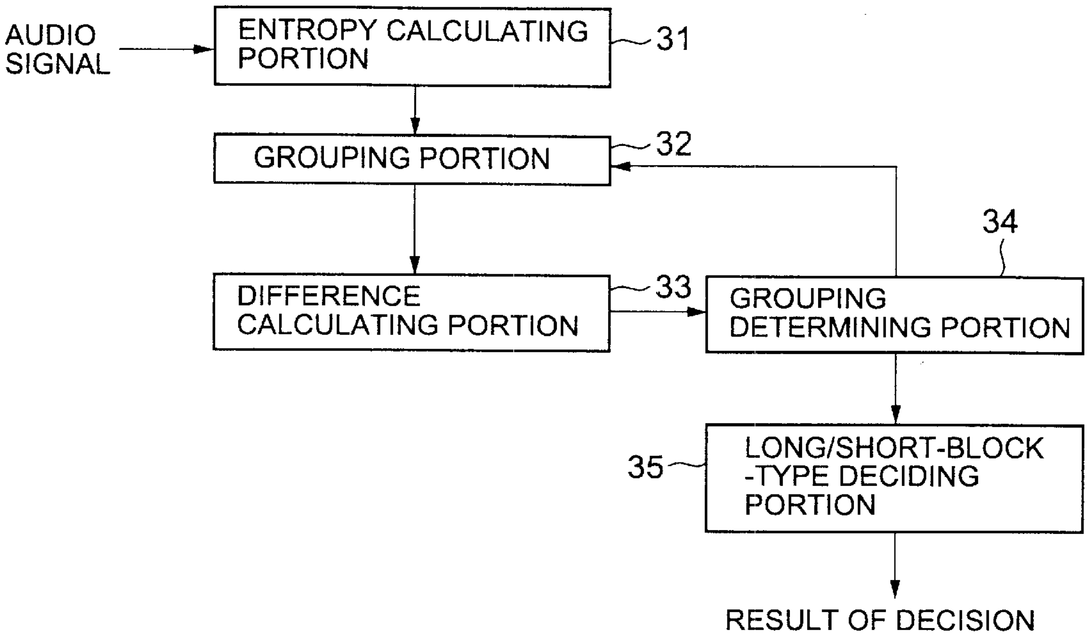
FIG. 8B is a block diagram showing an example of an arrangement for performing the operations shown in FIG. 8A.

Then, operations similar to those described above are repeated until i=5. After i=6 in the step S45, the operation passes through the determination in the step S46, and returns to the step S43. Then, because tb[6][7]=0.67>0.6=th7, tb[6][8]=0.95>0.9=th8 and tb[6][9]=0.89>0.8=th9, the result of the determination in the step S43 is YES. Then, the operation proceeds to a step S44. Then, tonal_flag=1. Then, i =7, in the step S45. Then, the operation passes through the step S46 and returns to the step S43. When i=7, because tb[7][7]=0.42<0.6=th7, tb[7][8]=0.84<0.9=th8 and tb[7][9]=0.81>0.8=th9, the result of the determination in the step S43 is NO. Then, the operation proceeds to the step S45. It is noted that tonal_flag=1 is maintained. Then, after i=8 in the step S45, the operation passes through the determination of the step S46, and, at this time, proceeds to a step S47. Then, the value of tonal_flag is examined. In this example, because tonal_flag=1, the determination of the step S47 is YES, and the operation proceeds to a step S48. Therefore, it is decided to use the long block type for the block of the input audio signal for performing MDCT on the input audio signal. When tonal_flag≠1, the determination of the step S47 is NO, and the operation proceeds to a step S49. Therefore, in the step S49, a decision as to whether the long or short block type is used is made by another method such as the method described in ISO/IEC13818-7. For example, at this time, when a decision as to whether the long or short block type is used is made in the method shown in FIG. 8A, the short blocks of the block of the input audio signal are grouped in a manner such that the difference between the maximum value and minimum value in perceptual entropy for the short blocks in the same group is smaller than a threshold. Then, when the result thereof is such that the number of groups is 1, or this condition and another condition are satisfied, MDCT is performed on the input audio signal using the long block type for the block of the input audio signal. In the other cases, MDCT is performed on the input audio signal using the short block type for the block of the input audio signal.

However, in this method, when the number of scalefactor bands used for the decision is small, the tonality in only a limited number of scalefactor bands is considered. Accordingly, in a case where the tonality is high in other scalefactor bands, and, therefore, the long block type should be used, a decision is made to use the short block type. Further, when the number of scalefactor bands used for the decision is large, a decision is made to use the long block type only in a special case where the tonality is high in every scalefactor band thereof. The reason why such problems occur is that the tonality index being larger than a predetermined threshold in every one of predetermined one or a plurality of scalefactor bands is used as a condition for the decision.

Further, generally, when the sampling frequency of an input audio signal is low, the resolution in the frequency domain in each scalefactor band is high. Therefore, as the sampling frequency becomes lower, the signal of a certain frequency is included in a higher scalefactor band. Therefore, when scalefactor bands and thresholds for tonality indexes used for making a decision as to whether the long or short block type is used are fixed regardless of the sampling frequency, an appropriate decision cannot be made. Further, in a case where a sampling frequency is sufficiently low, decisions using tonality indexes are not needed. This is because, in this case, the resolutions in scalefactor bands are sufficiently high, thereby, the matter that, due to decrease in the resolution in the frequency domain when the short block type is used, the energy of the original audio data is dispersed to surrounding frequency bands, and the energy thus spreads to the outside of the masking range in low-frequency components of the human ear, does not occur.

The operations of a second embodiment of the present invention will now be described using FIGS. 11 and 15.

First, successive 8 short blocks i (0≦i≦7) are obtained from the block of the input audio signal by the block obtaining portion 11. For each of the thus-obtained 8 short blocks, the tonality indexes in the respective scalefactor bands sfb are calculated by the tonality-index calculating portion 12. First, the tonality index tb[i][sfb] in the scalefactor band sfb of the short block i is obtained, in a step S50, wherein, as shown in FIG. 13, sfb represents consecutive numbers for identifying the respective scalefactor bands. The calculation of the tonality indexes is performed in accordance with the method described in the step 7 of the above-described long/short-block-type deciding method for a target block in ISO/IEC13818-7. Initializing is performed such that tonal_flag=0 in a step S51. Further, the number i (representing a respective one of consecutive numbers of the short blocks) is initialized so that i=0 in a step S52. Then, for the short block i, the comparing portion 13 determines whether, in each of the predetermined one or plurality of scalefactor bands, the tonality index is larger than a respective one of thresholds predetermined for the respective scalefactor bands, in a step S53. In the example of FIG. 15, this determination is performed for the scalefactor bands, sfb of which are 6, 7, 8 and 9, and, the threshold for the tonality index for each scalefactor band is determined as follows: th61 for sfb=6, th71 and th72 for sfb=7, th81 and th82 for sfb=8, and th91 for sfb=9. Further, it is determined whether or not the following logical determination expression (condition) is satisfied; {tb[i][6]>th61 AND tb[i][7]>th71} OR {tb[i][7]>th72 AND tb[i][8]>th81} OR {tb[i][8]>th82 AND tb[i][9]>th91}, in a step S53.

In this example, it is assumed that, for each short block i, the values of the tonality indexes in the scalefactor bands, sfb of which are 6, 7, 8 and 9, are those shown in FIG. 14. Further, it is determined that th61=0.7, th71=0.8, th72=0.8, th81=0.9, th82=0.8 and th91=0.9. Then, the logical determination expression in the step S53 is {tb[i][6]>0.7 AND tb[i][7]>0.8} OR {tb[i][7]>0.8 AND tb[i][8]>0.9} OR {tb [i][8]>0.8 AND tb[i][9]>0.9}. In this expression, the determination expression, tb[i][7]>0.8, occurs twice. Further, for tb[i][8], the two different determination expressions, tb[i] [8]>0.9 and tb[i][8]>0.8, exist.

In the example of FIG. 14, when i=0 at first, tb[0][6]=0.09, tb[0][7]=0.12, tb[0][8]=0.08, tb[0][9]=0.15. Therefore, the determination in the step S53 by the comparing portion 13 is NO. Then, the operation proceeds to a next step S55. Then, in the step S55, the value of i is incremented by 1 so that i=1, and the operation passes through the determination in a step 56, and returns to the step S53.

Operations similar to those described above are repeated until i=5. After i=6 in a step S55, the operation pass through the determination in the step 56, and returns to the step S53. Then, tb[6][6]=0.67, tb[6][7]=0.82, tb[6][8]=0.95, tb[6][9]=0.89. Therefore, the determination in the step S53 by the comparing portion 13 is YES. Then, the operation proceeds to a next step S54. Then, tonal_flag=1 in the step s54. Then, i=7 in the step S55, the operation passes through the step S56 and returns to the step S53. When i=7, tb[7][6]=0.23, tb[7][7]=0.42, tb[7][8]=0.84, tb[7][9]=0.81. Therefore, the determination in the step S53 by the comparing portion 13 is NO. Then, the operation proceeds to the step S55. However, tonal_flag=1 is maintained. Then, after i=8 in the step S55, the operation passes through the determination in the step S56, and, then, at this time, proceeds to a step S57. Then, the value of tonal_flag is examined in the step S57. In this example, because tonal_flag=1, the result of the determination in the step S57 is YES, and the operation proceeds to a step S58. Then, by the long/short-block-type deciding portion 14, it is decided to use the long block type for the block of the input audio signal, that is, a single long block is obtained from the block of the input audio signal for performing MDCT on the input audio signal.

Then, as another example, a case where the values of the tonality indexes in the scalefactor bands, sfb of which are 6, 7, 8 and 9, are those shown in FIG. 16. However, it is not changed that th61=0.7, th71=0.8, th72=0.8, th81=0.9, th82=0.8 and th91=0.9. In this case, different from the example shown in FIG. 14, no short block i, for which {tb[i][6]>0.7 AND tb[i][7]>0.8} OR {tb[1][7]>0.8 AND tb[i][8]>0.9} OR {tb[i][8]>0.8 AND tb[i][9]>0.9} is satisfied, exists. Therefore, the determination in the step S53 by the comparing means 13 is always NO, and, as a result, the operation never passes through the step S54. As a result, the value of tonal_flag is maintained to be the initial value so that tonal_flag=0, and, therewith, the operation proceeds to the step S57.

Then, because the result of the determination in the step S57 is NO, the operation proceeds to a next step S59, and, a decision as to whether the long or short block type is used is made by another method such as the method described in ISO/IEC13818-7 or the like, in the step S59. For example, at this time, when a decision as to whether the long or short block type is used is made in the method shown in FIG. 8A, the short blocks of the block of the input audio signal are grouped in a manner such that the difference between the maximum value and minimum value in perceptual entropy for the short blocks in the same group is smaller than a threshold. Then, when the result thereof is such that the number of groups is 1, or this condition and another condition are satisfied, it is decided to use the long block type, that is, a single long block is obtained from the block of the input audio signal for performing MDCT on the input audio signal. In the other cases, it is decided to use the short block type, that is, a plurality of short blocks are obtained from the block of the input audio signal for performing MDCT on the input audio signal.

The scalefactor bands used in the decision as to whether the long or short block type is used are not limited to those, sfb of which are 6, 7, 8 and 9. Further, the respective thresholds are not limited to th61=0.7, th71=0.8, th72=0.8, th81=0.9, th82=0.8 and th91=0.9. Furthermore, the arrangement of the logical determination expression is not limited to the above-mentioned example. Various arrangements such as {tb[i][6]>th61 AND tb[i][7]>th71 AND tb[i][8] >th81 } OR {tb[i][8]>th82 AND tb[i][9]>th91}, tb[i][6] >th61 OR th[i][7]>th71 OR tb[i][8]>th81 OR tb[i][9]>th91, simply tb[i][6]>th61, or the like can be used.

A third embodiment of the present invention will now be described using FIG. 17. Here, a method is provided by which a decision as to whether the long or short block type is used can be made appropriately depending on the sampling frequency of an input audio signal. In this method, the scalefactor bands to be used for the decision using the tonality indexes, thresholds for the tonality indexes determined for the respective scalefactor bands, and logical determination expression used in the decision using the tonality indexes, in a step S53 in FIG. 15, are determined individually for each sampling frequency.

A specific example thereof will now be described using a flow chart shown in FIG. 17. Here, a case is considered where the sampling frequency of an input audio signal is lower than that for which the example shown in FIG. 15 is used. The flow chart shown in FIG. 17 is the same as that shown in FIG. 15 except that the step S53 in FIG. 15 is replaced by a step S63.

As described above, when the sampling frequency of an input audio signal is low, the resolution in the frequency domain in each scalefactor band is high. Therefore, as the sampling frequency becomes lower, the signal of a certain frequency is included in a higher (larger-sfb) scalefactor band. Therefore, when the above-described example is used for an input audio signal, the sampling frequency of which is lower, the number of scalefactor bands used for the decision using the tonality indexes is increased, and these scalefactor bands are higher (larger-sfb) ones.

Figure 17:
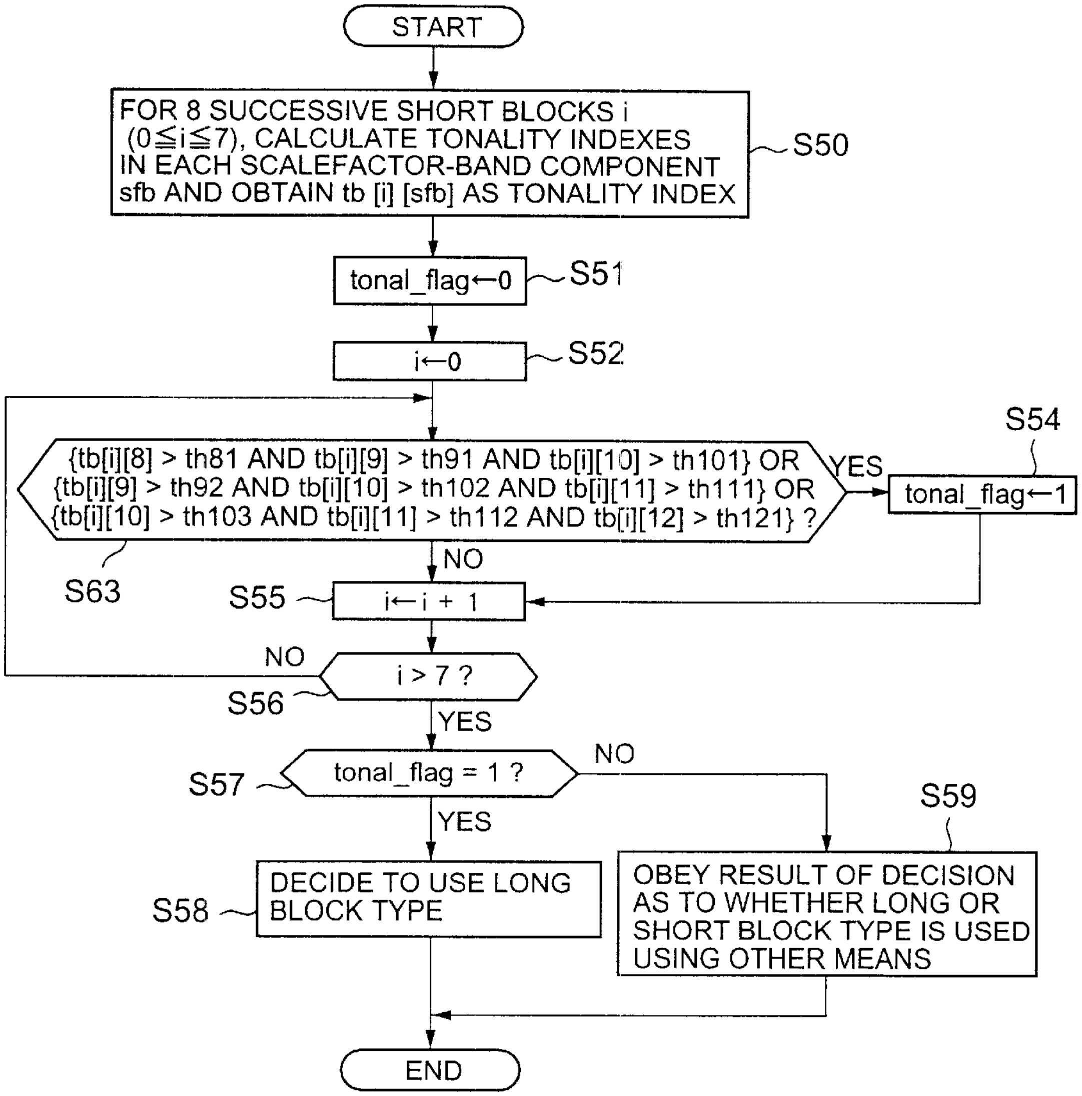
FIG. 17 is a flow chart of operations of the digital-audio-signal processing device in a third embodiment of the present invention (but it is also possible to consider this flow chart to be a flow chart of other operations of the digital-audio-signal processing device in the second embodiment of the present invention)

In the step S63 in FIG. 17, sfb=8, 9, 10, 11 and 12. Further, the thresholds for the tonality indexes are determined as follows: th81 for sfb=8, th91 and th92 for sfb=9, th101, th102 and th103 for sfb=10, th111 and th112 for sfb=11 and th121 for sfb=12. Similarly to the example shown in FIG. 15, specific values are predetermined for the respective thresholds, th81, th91, . . . Then, the logical determination expression for making a decision as to whether the long or short block type is used is determined to be {tb[i][8]>th81 AND tb[i][9]>th91 AND tb[i][10]>th101}

OR {tb[i][9]>th92 AND tb[i][10]>th102 AND tb[i][11] >th111} OR {tb[i][10]>th103 AND tb[i][11]>th112 AND tb[i][12]>th121}.

Figure 15:
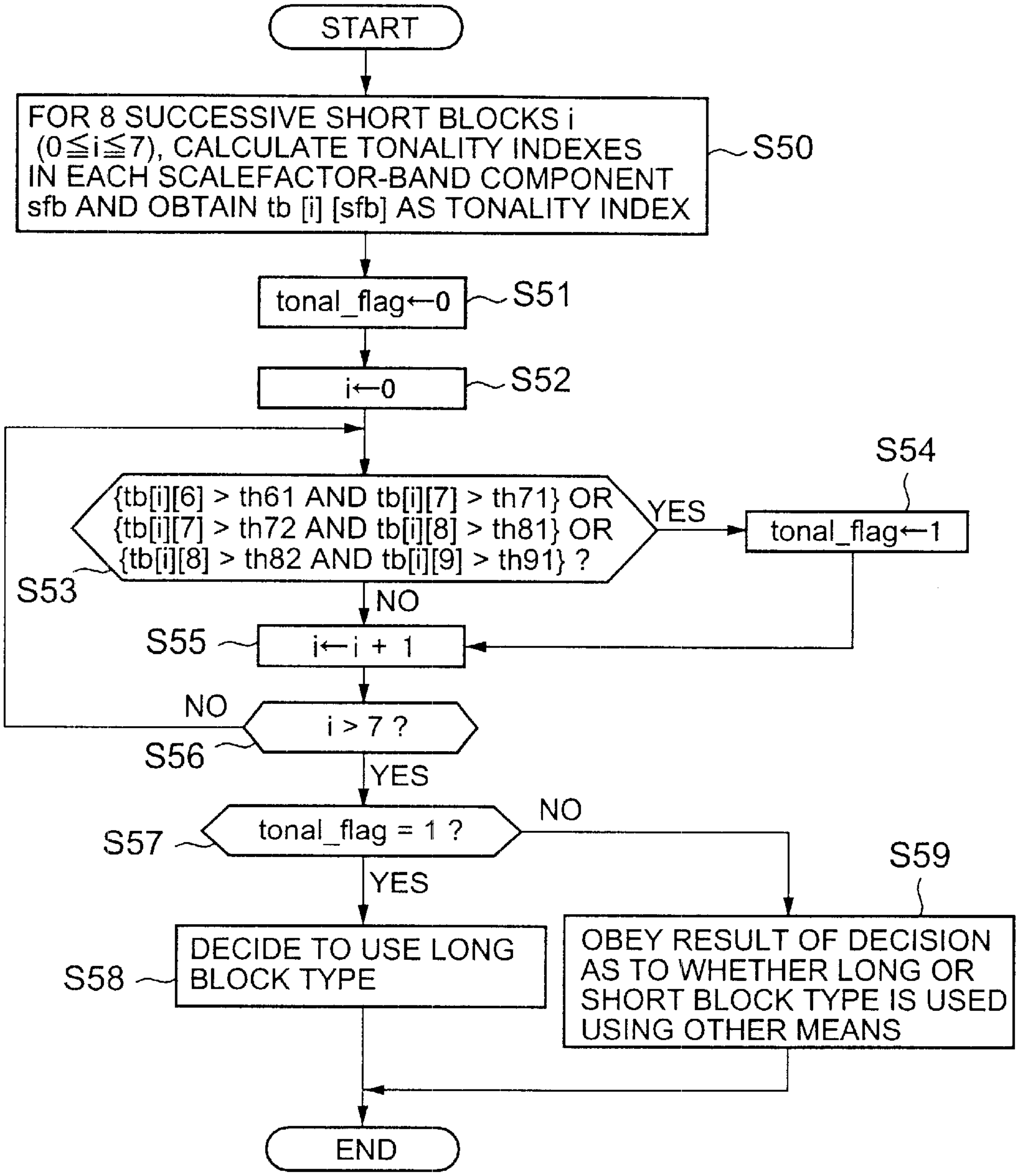
FIG. 15 is a flow chart of operations of the digital-audio-signal processing device in a second embodiment of the present invention.

Except for the decision in the step S63, a decision is made as to whether the long or short block is used through operations similar to those in the example shown in FIG. 15.

Similarly, for another sampling frequency, a decision is made as to whether the long or short block type is used through operations the same as those shown in FIG. 15 except that the step S53 (S63 in FIG. 17) is replaced by another one suitable for the sampling frequency.

In a case where the sampling frequency of an input audio signal is further lowered, because the resolutions in the scalefactor bands are sufficiently high as described above, a decision using tonality indexes is not needed. Therefore, when the sampling frequency of an input audio signal is lower than a predetermined threshold, a method using tonality indexes is not used, and, a decision as to whether the long or short block type is used is made only by another method. Specifically, when the threshold predetermined for the sampling frequency is such that th_sf 24 kHz, for example, the sampling frequency of an input audio signal is compared therewith, and, when the sampling frequency is lower than 24 kHz, a method for making a decision as to whether the long or short block type is to be used based on tonality indexes is not used, and a decision as to whether the long or short block type is used is made only by a method using other means (for example, the method shown in FIG. 8A). When the sampling frequency is equal to or higher than 24 kHz, both a method for making a decision as to whether the long or short block type is used using tonality indexes and a method for making a decision as to whether the long or short block type is used using other means (for example, the method shown in FIG. 8A) are used. When both a method for making a decision as to whether the long or short block type is used using tonality indexes and a method for making a decision as to whether the long or short block type is used using other means (for example, the method shown in FIG. 8A) are used, a decision as to whether the long or short block type is used is made using scalefactor bands used for a decision based on tonality indexes, thresholds for the tonality indexes determined for the respective scalefactor bands, and logical determination expression for making a decision as to whether the long or short block type is used, wherein the scalefactor bands used for a decision based on tonality indexes, thresholds for the tonality indexes determined for the respective scalefactor bands, and logical determination expression for making a decision as to whether the long or short block type is used are determined individually for each sampling frequency. A relationship with a result of decision using other means is that described in the description of the example shown in FIG. 15 (the steps S57, S58 and S59). That is, when the decision is made to use the long block type in a method using tonality indexes, the input audio signal is mapped into the frequency domain using the long block type for the block of the input audio signal regardless of the decision made in a method using other means. When the decision is not made to use the long block type in the method using tonality indexes, the input audio signal is mapped into the frequency domain using a block type in accordance with the decision made in the method using other means for the block of the input audio signal.

Figure 18A:
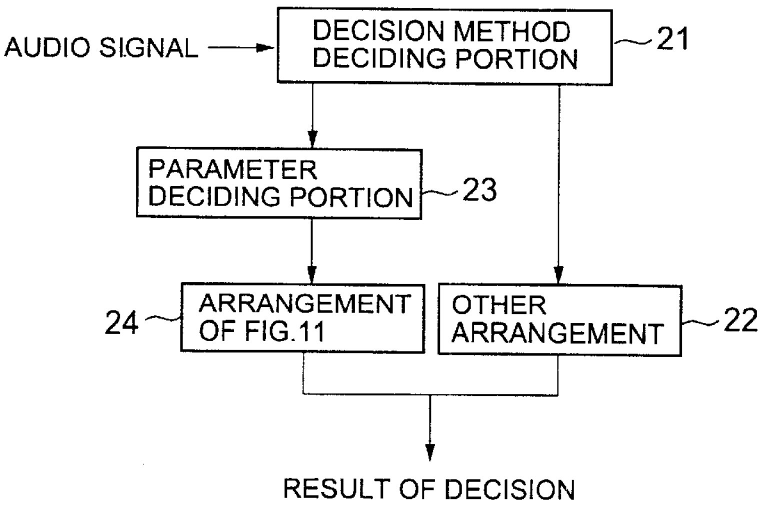
FIG. 18A is a block diagram partially showing the digital-audio-signal processing device in a fourth embodiment of the present invention.
Figure 18B:
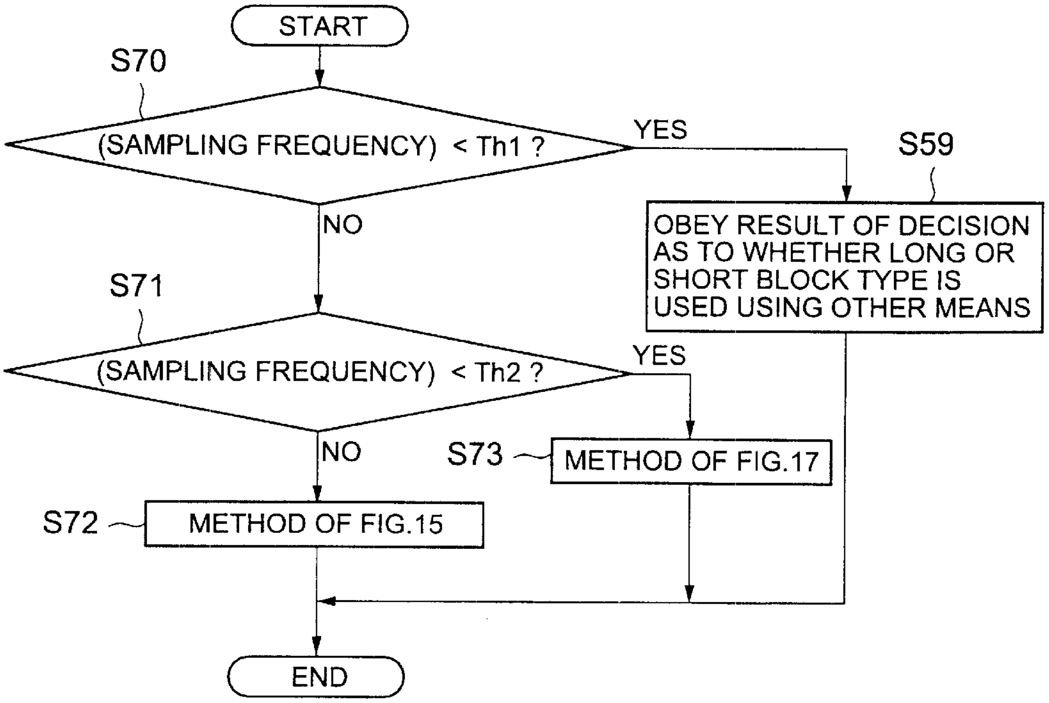
FIG. 18B is a flow chart showing operations performed by the arrangement shown in FIG. 18A.

FIGS. 18A and 18B illustrate such a method (a fourth embodiment of the present invention). The arrangement shown in FIG. 11 may be replaced by the arrangement shown in FIG. 18A. When the sampling frequency of an input audio signal is lower than a first threshold Th1 (YES in a step S70 in FIG. 18B), it is decided by a decision method deciding portion 21 shown in FIG. 18A that a decision is made as to whether the long or short block type is used in a method using other means in a step S59 shown in FIG. 18B performed by another arrangement 22 shown in FIG. 18A (for example, the arrangement shown in FIG. 8A for performing the method shown in FIG. 8A). When the sampling frequency of an input audio signal is equal to or higher than the first threshold Th1 (NO in the step S70 in FIG. 18B), the sampling frequency is compared with a second threshold Th2 higher than the first threshold Th1 in a step S71. When the sampling frequency is lower than the second threshold Th2 (YES in the step S71 in FIG. 18B), it is decided by a parameter deciding portion 23 shown in FIG. 18A that a decision is made as to whether the long or short block type is used in a method shown in FIG. 17 performed by the arrangement (shown in FIG. 11) 24 shown in FIG. 18A in a step S73, in which the scalefactor bands, sfb of which are 8, 9, 10, 11 and 12 are selected; the thresholds for the tonality indexes are determined as follows: th81 for sfb=8, th91 and th92 for sfb=9, th101, th102 and th103 for sfb=10, th111 and th112 for sfb=11 and th121 for sfb=12; and the logical determination expression for making a decision as to whether the long or short block type is used is determined to be {tb[i][8]>th81 AND tb[i][9]>th91 AND tb[i][10]>th101} OR {tb[i][9]>th92 AND tb[i][10]>th102 AND tb[i][11] >th111} OR {tb[i][10]>th103 AND tb[i][11]>th112 AND tb[i][12]>th12}. When the sampling frequency is equal to or higher than the second threshold Th2 (NO in the step S71 in FIG. 18B), it is decided by the parameter deciding portion 23 shown in FIG. 18A that a decision is made as to whether the long or short block type is used in a method shown in FIG. 15 performed by the arrangement (shown in FIG. 11) 24 shown in FIG. 18A in a step S72, in which the scalefactor bands, sfb of which are 6, 7, 8 and 9 are selected; the threshold for the tonality index for each scalefactor band is determined as follows: th61 for sfb=6, th71 and th72 for sfb=7, th81 and th82 for sfb=8, and th91 for sfb=9; and the logical determination expression for making a decision as to whether the long or short block type is used is determined to be: {tb[i][6]>th61 AND tb[i][7]>th71} OR {tb[i][7]>th72 AND tb[i][8]>th81} OR {tb[i][8]>th82 AND tb[i][9]>th91}.

The present invention can be practiced using a general purpose computer that is specially configured by software executed thereby to carry out the above-described functions of the digital-audio-signal coding method in any embodiment according to the present invention.

Figure 19:
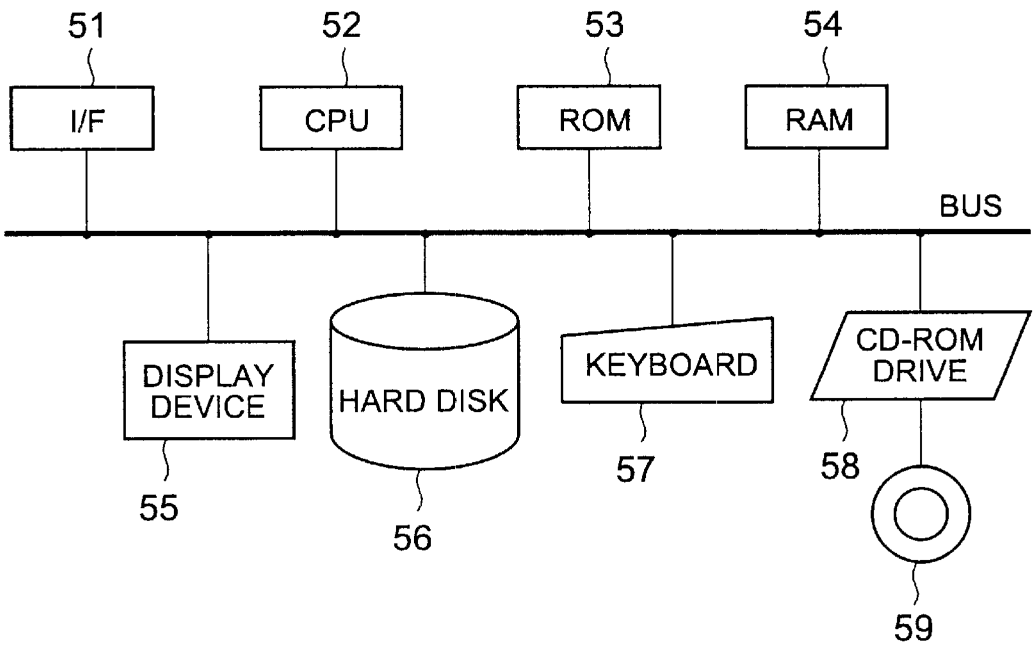
FIG. 19 is a block diagram showing one example of a hardware configuration of the digital-audio-signal processing device according to the present invention.

FIG. 19 shows such a general purpose computer that is specially configured by executing software stored in a computer-readable medium. The computer includes an interface (abbreviated to I/F, hereinafter) 51, a CPU 52, a ROM 53, a RAM 54, a display device 55, a hard disk 56, a keyboard 57 and a CD-ROM drive 58.

Program code instructions for carrying out the digital-audio-signal coding method in any embodiment according to the present invention are stored in a computer-readable medium such as a CD-ROM 59. When a control signal is input to this computer via the I/F 51 from an external apparatus, the instructions are read by the CD-ROM drive 58, and are transferred to the RAM 54 and then executed by the CPU 52, in response to instructions input by an operator via the keyboard 57 or automatically. Thus, the CPU 52 performs coding processing in the digital-audio-signal coding method according to the present invention in accordance with the instructions, stores the result of the processing in the RAM 54 and/or the hard disk 56, and outputs the result on the display device 55, if necessary. Thus, by using a medium in which program code instructions for carrying out the digital-audio-signal coding method according to the present invention are stored, it is possible to practice the present invention using a general purpose computer.

Further, the present invention is not limited to the above-described embodiments and variations and modifications may be made without departing from the scope of the present invention.

The present application is based on Japanese priority application No. 11-077703, filed on Mar. 23, 1999, the entire contents of which are hereby incorporated by reference.

What is claimed is:

1. A device for coding a digital audio signal comprising:

a converting portion which converts each of blocks of an input digital audio signal into a number of frequency-band components, the blocks being produced from the signal along a time axis;

a bit-allocating portion which allocates coding bits to each frequency band;

a scalefactor determining portion which determines a scalefactor in accordance with the number of the coding bits thus allocated; and a quantizing portion which quantizes the digital audio signal using the thus-determined scalefactors, wherein:

said converting portion comprises a block-type deciding portion which makes a decision as to whether a long or short block type is used for mapping the input digital audio signal into the frequency domain;

said block-type deciding portion comprises:

a tonality-index calculating portion which calculates a tonality index of the digital audio signal in each of a predetermined one or plurality of frequency bands of the number of frequency bands;

a comparing portion which compares each of the thus-calculated tonality indexes with a predetermined one or plurality of thresholds; and a deciding portion which makes a decision as to whether the long or short block type is used based on the thus-obtained comparison result.

2. The device as claimed in claim 1, wherein, when the plurality of thresholds are predetermined for the tonality index in an arbitrary frequency band, a different determination expression is provided for each threshold.

3. The device as claimed in claim 1, wherein said comparing portion determines that a determination condition for making the decision to use the long block type is satisfied when the tonality index is larger than the predetermined threshold for the corresponding frequency band.

4. The device as claimed in claim 1, wherein said comparing portion uses a logical determination expression obtained as a result of determination conditions being combined in a form of logical product and/or logical sum as a determination expression for making a decision as to whether the long or short block type is used, each determination condition being such that the tonality index is larger than the predetermined threshold for the corresponding frequency band.

5. The device as claimed in claim 1, wherein said comparing portion uses a logical determination expression comprising a single or a combination of determination conditions, said combination being obtained as a result of said determination conditions being combined in a form of logical product and/or logical sum, each determination condition being such that the tonality index is larger than the predetermined threshold for the corresponding frequency band.

6. The device as claimed in claim 1, wherein said block-type deciding portion further comprises a parameter deciding portion which decides parameters and/or a determining expression to be used in a process of making a decision as to whether the long or short block type is used, depending on the sampling frequency of the input digital audio signal.

7. The device as claimed in claim 6, wherein said block-type deciding portion further comprises a decision method deciding portion which makes a decision that the tonality indexes are used for making a decision as to whether the long or short block is used, when the sampling frequency of the input digital audio signal is larger than a predetermined threshold.

8. The device as claimed in claim 1, wherein said block-type deciding portion further comprises a decision method deciding portion which makes a decision that the tonality indexes are used for making a decision as to whether the long or short block is used, when the sampling frequency of the input digital audio signal is larger than a predetermined threshold.

9. The device as claimed in claim 6, wherein said parameter deciding portion increases the number of the frequency bands to be used and shifts the frequency bands to be selected to higher ones, when the sampling frequency is lower.

10. A method for coding a digital audio signal, comprising the steps of:

converting each of blocks of an input digital audio signal into a number of frequency-band components, the blocks being produced from the signal along a time axis;

allocating coding bits to each frequency band;

determining a scalefactor in accordance with the number of the coding bits thus allocated; and quantizing the digital audio signal using the thus-determined scalefactors, wherein:

said converting step comprises a block-type deciding step for making a decision as to whether a long or short block type is used for mapping the input digital audio signal into the frequency domain;

said block-type deciding step comprises the steps of:

calculating a tonality index of the digital audio signal in each of a predetermined one or plurality of frequency bands of the number of frequency bands;

comparing each of the thus-calculated tonality indexes with a predetermined one or plurality of thresholds; and making a decision as to whether the long or short block type is used based on the thus-obtained comparison result.

11. A computer readable medium storing program code for causing a computer to code a digital audio signal, comprising:

first program code means for converting each of blocks of an input digital audio signal into a number of frequency-band components, the blocks being produced from the signal along a time axis;

second program code means for allocating coding bits to each frequency band;

third program code means for determining a scalefactor in accordance with the number of the coding bits thus allocated; and fourth program code means for quantizing the digital audio signal using the thus-determined scalefactors, wherein:

said first program code means comprises fifth program code means for making a decision as to whether a long or short block type is used for mapping the input digital audio signal into the frequency domain;

said fifth program code means comprises:

program code means for calculating a tonality index of the digital audio signal in each of a predetermined one or plurality of frequency bands of the number of frequency bands;

program code means for comparing each of the thus-calculated tonality indexes with a predetermined one or plurality of thresholds; and program code means for making a decision as to whether the long or short block type is used based on the thus-obtained comparison result.

* * * * *

UNITED STATES PATENT AND TRADEMARK OFFICE

CERTIFICATE OF CORRECTION

PATENT NO. : 6,456,963 B1
DATED : September 24, 2002
INVENTOR(S) : Tadashi Araki It is certified that error appears in the above-identified patent and that said Letters Patent is hereby corrected as shown below:

Title page, Item [54] and Column 1, lines 1 and 2,
Please cancel "BLOCK LENGTH DECISION BASED ON TONALITY INDEX", substitute -- DIGITAL-AUDIO-SIGNAL CODING DEVICE, DIGITAL-AUDIO-SIGNAL CODING METHOD, AND MEDIUM IN WHICH DIGITAL-AUDIO-SIGNAL CODING PROGRAM IS STORED --

Signed and Sealed this

Twenty-ninth Day of April, 2003

JAMES E. ROGAN
*Director of the United States Patent and Trademark Office*